(12) United States Patent
Bu et al.

(10) Patent No.: US 7,991,852 B2
(45) Date of Patent: Aug. 2, 2011

(54) NETWORK ARCHITECTURE AND RELATED METHODS FOR SURVIVING DENIAL OF SERVICE ATTACKS

(75) Inventors: Tian Bu, Edison, NJ (US); Samphel Norden, Eatontown, NJ (US); Thomas Woo, Red Bank, NJ (US)

(73) Assignee: Alcatel-Lucent USA Inc., Murray Hill, NJ (US)

(*) Notice: Subject to any disclaimer, the term of this patent is extended or adjusted under 35 U.S.C. 154(b) by 2169 days.

(21) Appl. No.: 10/762,391

(22) Filed: Jan. 22, 2004

(65) Prior Publication Data
US 2005/0165901 A1 Jul. 28, 2005

(51) Int. Cl.
G06F 15/16 (2006.01)
(52) U.S. Cl. .................. 709/217; 709/227; 709/229
(58) Field of Classification Search .............. 709/223, 709/224, 238, 239, 234, 200–203, 217, 227, 709/229
See application file for complete search history.

(56) References Cited

U.S. PATENT DOCUMENTS

| | | | | |
|---|---|---|---|---|
| 5,539,659 A * | 7/1996 | McKee et al. | ................. | 709/224 |
| 5,751,963 A | 5/1998 | Umetsu | | |
| 5,802,503 A * | 9/1998 | Sansone | ....................... | 705/401 |
| 6,192,054 B1 * | 2/2001 | Chan et al. | ................... | 370/452 |
| 7,185,077 B1 * | 2/2007 | O'Toole et al. | ................ | 709/223 |
| 2002/0002686 A1 * | 1/2002 | Vange et al. | .................. | 713/201 |
| 2002/0124106 A1 | 9/2002 | Dolganow et al. | | |
| 2002/0163882 A1 * | 11/2002 | Bornstein et al. | ............. | 370/227 |
| 2002/0174217 A1 | 11/2002 | Anderson | | |
| 2004/0148357 A1 * | 7/2004 | Corrigan et al. | .............. | 709/206 |
| 2004/0255323 A1 * | 12/2004 | Varadarajan et al. | ........... | 725/25 |
| 2005/0108331 A1 * | 5/2005 | Osterman | .................... | 709/205 |

FOREIGN PATENT DOCUMENTS

EP 1 067 736 1/2001

OTHER PUBLICATIONS

European Search Report for Application No. EP 05 25 0060 dated Apr. 13, 2005.
Article entitled, "On Detecting Service Violations and Bandwidth Theft in QoS Network Domains", authored by Ahsan Habib, Sonia Fahmy, Srinivas R. Avasarala, Venkatesh Prabhakar and Bharat Bhargava, published in Computer Communications, vol. 26, No. 8—May 5, 2003 Issue—pp. 861-871.

(Continued)

Primary Examiner — Moustafa M Meky
(74) Attorney, Agent, or Firm — Carlson, Gaskey & Olds PC (57) ABSTRACT

Network architecture and related methods for maintaining traffic flow between clients and an end-server during a Denial of Service (DoS) attack are described herein. The network architecture includes a set of overlay nodes coupled between clients and a server. Each overlay node is able to rank and probe other nodes for purposes of selecting a best path for routing traffic to the end-server to resist a denial of service of attack. Probing is performed to detect overlay nodes having better performance based on one or more performance metrics (i.e., load, jitter, latency, loss rate). For instance, in one implementation probing detects lightly loaded overlay paths for purposes of routing traffic to the end-server, so as to maintain connectivity between the end-server and clients even under DoS attacks.

26 Claims, 4 Drawing Sheets

OTHER PUBLICATIONS

Symposium on Operating Systems Principles Conference Paper entitled, "Resilient Overlay Networks" authored by David Andersen, Hari Balakrishnan, Frans Kaashoek and Robert Morris presented in Oct. 2001 and published in Dec. 2001, ISSN: 0163-5980 and retrieved from the Internet website of http://nms.lcs.mit.edu/ron on Apr. 12, 2005.

Article entitled, "Edge-To-Edge Measurement-Based Distributed Network Monitoring" authored by Ahsan Habib, Maleq Khan and Bharat Bhargava and published in vol. 44, No. 2—Feb. 5, 2004 issue of Computer Networks (pp. 211-233) which is published by Elsevier Science Publishers B.V.—ISSN: 1389-1286.

* cited by examiner

NETWORK ARCHITECTURE AND RELATED METHODS FOR SURVIVING DENIAL OF SERVICE ATTACKS

TECHNICAL FIELD

The present invention relates generally to network security, and more particularly, to network architectures and methods used for countering denial of service attacks.

BACKGROUND

Denial of Service (DoS) attacks typically involve blasting a network node, such as a Web site, an Internet Service Provider (ISP), and other servers, with a large volume of traffic that exceeds it processing capabilities, thus knocking the afflicted node out the network for the duration of the attack.

Another more sophisticated attack is referred to as a Distributed DoS (DDoS). An attacker intending to launch a DDoS attack begins by subverting a number of nodes, e.g., via well-known security loopholes. These compromised nodes essentially become slaves of the attacker and act as launch points to inject traffic into the network. By summoning a reasonable number of compromised nodes, an attacker could potentially launch a large-scale network wide attack by cascading the traffic from multiple launch points. Launching a large-scale DDoS attack is proving easier than expected. For example, both e-mail attachments and active Web page contents have been exploited in a variety of ways to spread malicious content (such as viruses) that compromise network nodes. For purposes of discussion herein, the term "Denial of Service" (DoS), unless specifically specified, shall include generally all forms of denial of service attacks including DDoS attacks.

Although most DoS discussion in the industry focuses on the overloading of the end server hosts, DoS also disrupts services by congesting the communication path between clients and end server hosts, thus taking away bandwidth for legitimate client requests; referred to herein as network DoS. It should be noted that network DoS encompasses DoS attacks on nodes since a node is effectively rendered inactive, if all the links connecting the node to other nodes are under attack.

There is no dearth of research attempting to counter all such DoS attacks. Indeed, a large variety of solutions have been proposed, but most require significant changes to network elements, and thus may be costly to deploy. Other proposed solutions involve collaboration across ISPs, which is impractical to implement in most instances given the complexities of establishing real-time and effective collaboration between ISPs.

Still, other approaches involve focusing on detecting and then blocking the attacks. However, such approaches are in a constant "cat and mouse" race with attackers. Indeed, more sophisticated DDoS attacks may evade detection altogether. In other words, it is very difficult to eliminate malicious traffic given the ever-increasing sophistication and adaptively tailored approaches used by attackers to avoid detection.

Accordingly, DoS attacks continue to pose significant threats to communication networks. In fact, the frequency and magnitude of the attacks involving the Internet have steadily been increasing. For mission-critical applications, such as disaster recovery and battlefield coordination, any disruption to service can entail serious consequences. Unfortunately, none of the current solutions used to combat DoS attacks guarantee complete protection against DoS attacks, leaving mission critical applications and other less critical applications vulnerable to attack.

SUMMARY

Network architecture and related methods for maintaining traffic flow between clients and a server during a Denial of Service (DoS) attack are described herein. The network architecture includes a set of overlay nodes coupled between clients and an end-server. Each overlay node is able to rank and probe other nodes for purposes of selecting the best path for routing traffic to the end-server in order to resist a denial of service of attack.

In one implementation, each overlay node is equipped with a ranking module and a probing module. The ranking module ranks other overlay nodes based on a performance metric. Typically, an overlay node with a higher-ranking indicates that the overlay node is considered to have better performance for transferring traffic to the server than overlay nodes with lower-rankings. The probing module is configured to probe a portion of the overlay nodes with higher-rankings more frequently than overlay nodes with lower-rankings during probing intervals. Each overlay node may further include a path selection module, configured to dynamically select an overlay node with a highest-rankings to be included as part of a pathway for transferring traffic to the server.

In another implementation, the network architecture includes access nodes, target nodes, and overlay nodes. The access nodes are configured to authenticate traffic directed to the server from the client. The target nodes are configured to transfer the traffic previously authenticated by the access nodes to the server. The overlay nodes are coupled between the access nodes and the target nodes. The overlay nodes are configured to route the traffic from the access nodes to the target nodes by selecting an end-to-end path between the client and the server based on the best path in accordance with at least one performance metric.

BRIEF DESCRIPTION OF THE DRAWINGS

The detailed description is described with reference to the accompanying figures. In the figures, the left-most digit(s) of a reference number identifies the figure in which the reference number first appears.

DETAILED DESCRIPTION

Overview

Instead of attempting to root out all malicious attacks as described in the Background section, described herein is a network architecture that uses a more defensive approach (although it is possible to couple the defensive approaches described herein with offensive approaches, such as those described in the Background section). Specifically, an adaptive defense perimeter is constructed around end servers that can maintain sufficient connectivity between legitimate clients and the end servers even in times of Denial of Service (DoS) attacks. Such a network architecture and related methods can be especially useful in emergency situations, guaranteeing communication between government agencies, emergency response teams, and troops communicating with command centers, even during DoS attacks.

In one implementation, a three-layer overlay network is used to protect legitimate communication between clients and a server from DoS attacks. At a first layer there are access nodes that perform authentication of clients, which means only legitimate clients will be able to initiate services through access nodes. These prevent an attacker from making a focused attack against any other layers by injecting illegitimate traffic into the other layers or the server. At the second layer there are overlay nodes that perform probing techniques to determine the best path, as defined by one or more performance metrics, to arrive at target nodes. And at the third layer there are target nodes, which act as a handoff point of traffic from the overlay nodes to the server (typically an end-server). The target nodes pass traffic to the server, if the traffic originated from one of the access nodes. Typically, only the target nodes have information identifying the server, so the only way to communicate with the server is through at least one target node.

Another feature associated with the exemplary overlay network herein, is the ability of nodes in the network to efficiently probe other nodes for purposes of selecting the best end-to-end path for routing traffic from the clients to the server. The probing is performed in accordance with a ranking associated with each node. Higher-ranked nodes, those with better performance, are probed more frequently than lower-ranked nodes, those with poor performance.

To better understand the significance of this feature it is helpful to first discuss conventional overlay networks. Briefly, one such conventional network is a Resilient Overlay Network (RON), which proposes the use of overlay networks for recovering from link outages and router failures. Accordingly, RON is not proposed for DoS attacks per se. RON nodes detect problems in the underlying network by aggressively probing all other RON nodes. When a node needs to communicate with another node, it simply sends its traffic to the nearest RON node, which in turn attempts to find the best path to the destination.

The aggressive probing is ideal for fast detection of failures, but comes with a substantial hit on scalability and efficiency. For instance, RON probes every node with the same frequency. If a node is congested, it is likely to remain congested for some duration, which is especially true in a DoS attack scenario. Thus, probing such links is inefficient and may further contribute to the load experienced by the overlay network.

As shall be described in more detail, the exemplary overlay network herein overcomes this problem by using a probing system that concentrates probing on higher-ranked nodes rather than lower-ranked nodes. Typically, a higher-ranked node has a higher connectivity potential for transferring traffic to the server than lower-ranked nodes, especially during a DoS attack. Accordingly, each overlay node probes other overlay nodes in a much more efficient manner than RON, based on ranking of the nodes. That is, each overlay node probes higher-ranked nodes more frequently than lower-ranked nodes, thus reducing the probing overhead, compared to RON, from $O(K)$ to $O(\log K)$, where K is the number of overlay nodes, and significantly increasing scalability. In other words, the innovative probing systems herein allow congested nodes/links time to recover, and perform probing in a more efficient and scalable manner than prior techniques.

In a different conventional approach, an overlay network, referred to as Secure Overlay Services (SOS), is specifically directed to protecting a fixed end server from DoS attacks. The end server is surrounded by a set of "secret" servlets, which are the only nodes to know the location of the end server. SOS uses what is referred to in the industry as a "Chord" technique to perform routing within the overlay. The Chord technique uses randomized routing which preserves anonymity of nodes. A node running the Chord method picks different paths for each packet to reach the end server. This helps to improve the overall security of an overlay, but substantially degrades performance. Since an overlay hop may actually span several physical hops, forwarding performance can suffer with significant latencies. The Chord technique also does not consider the current state of the network in that it makes no attempt to probe or adjust paths based on network performance. As a result Chord may incur ten times worse latency as compared to using a shortest path routing scheme. SOS focuses mostly on attacks (or network DoS attacks) and does not consider the physical topology of networks, ignoring the correlation between overlay and physical links. Its primary objective is protection, and little to no consideration is paid to performance.

In sharp contrast, the overlay network and its innovative probing systems described herein, not only maintain a high level of security, but maintain a maximum level of performance at all times. That is, by ranking nodes based on their performance and selecting those nodes with better performance (higher-rankings) as part of a path selection for routing traffic, the overlay network described herein substantially improves performance over SoS networks, while also maintaining as high a level of security.

Exemplary Network Architecture

Figure 1:
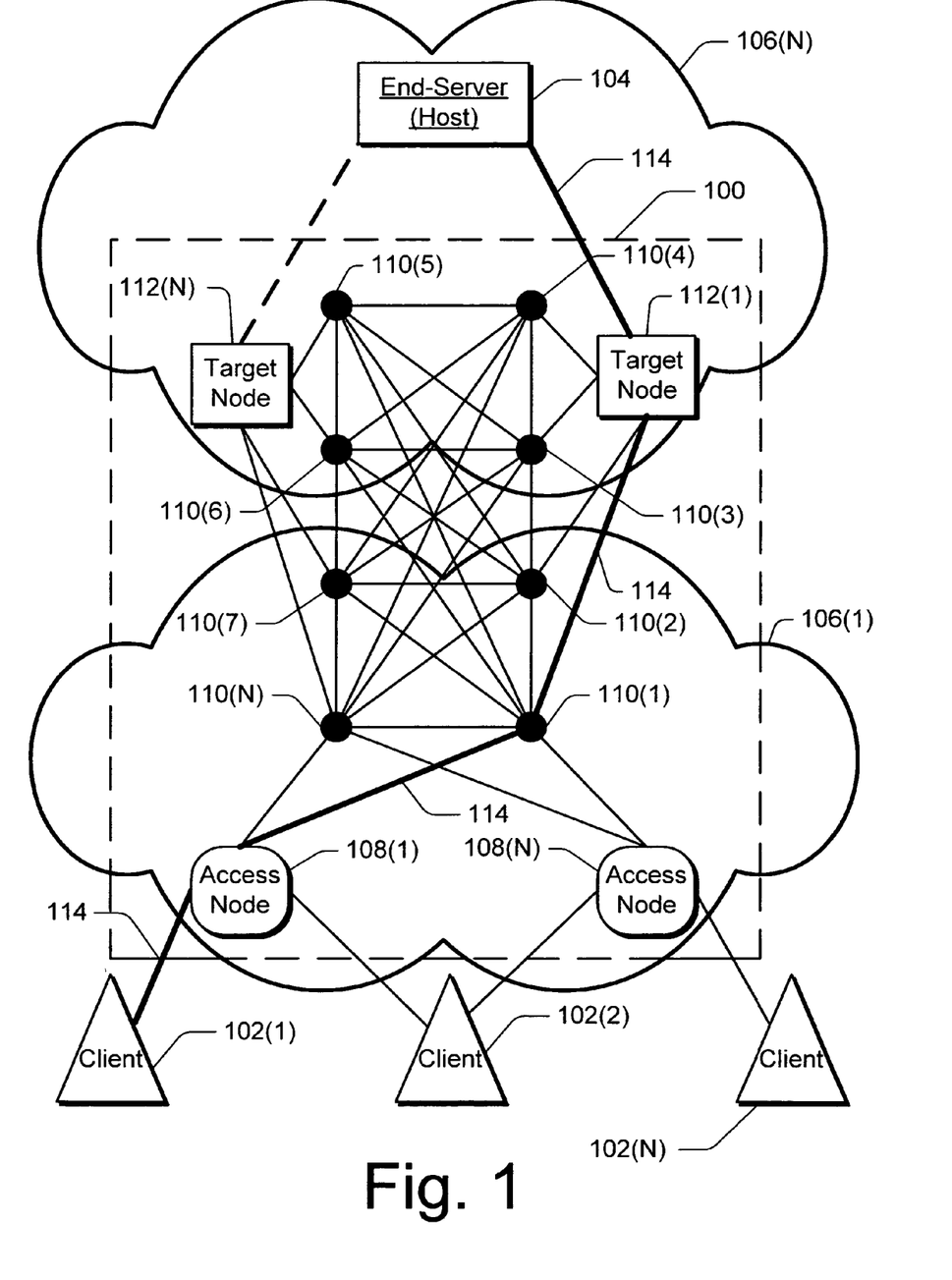
FIG. 1 illustrates an exemplary overlay network for countering a Denial of Service (DoS) attack.

FIG. 1 illustrates an exemplary overlay network 100 for countering a Denial of Service (DoS) attack. Overlay network 100 connects clients 102(1), 102(2), . . . , 102(N) to a particular server 104 (also referred to as a host, end-server or host-server).

In most instances, clients referred to generally as reference number 102, and server 104 reside outside of overlay network 100. Clients 102 can be implemented in many different ways. Examples of client implementations include, without limitation, personal computers, wireless/wired communication devices, personal digital assistances, stationary computers, gaming devices, portable computers, wired communicated devices, televisions, set-top boxes, and other smart devices.

Server 104 can represent several different hosting entities. It can be a single host entity, which occurs in cases where service cannot be easily replicated at different nodes (e.g., due to security concerns, dynamically changing content, etc.). Alternatively, server 104 can represent a replicated collection of distributed servers or a portal into another overlay network where the hosting service is actually provided. Server 104 may communicate with clients 102 (and vice versa) using any number of protocol communication standards such as, but not limited to, XML (extensible markup language), HTTP (hypertext transport protocol), SMTP (simple mail transfer protocol), WAP (wireless application protocol), and various other communication protocols.

In the exemplary implementation, overlay network 100 may be deployed across multiple physical backbone networks shown as clouds 106(1), . . . , 106(N), through virtual connections. Unlike the physical backbone networks, referred to generally as reference number 106, there is few, if any, physical routing policy constraints associated with an overlay network. That is, each node (described below) of overlay network 100 is virtually connected to every other node in the overlay network. For example, even though a particular node may be located in a physical network 106(1) in one location and another node is located in a physical network 106(N) remote from the first location, both nodes are considered connected as if they physically resided next to each other on the same physical network.

Overlay network 100 is configured to sustain communication between clients 102 and server 104, especially in times of DoS attacks. In the exemplary implementation, overlay network 100 includes: access nodes 108(1), ... 108(N), overlay nodes 110(1), 110(2), 110(3), 110(4), 110 (5), 110(6), 110(7), ... 110(N), and target nodes 112(1), ..., 112(N). The notation "N" denotes that there may be any number of devices. And as should be appreciated, the quantity of nodes illustrated in FIG. 1 are for discussion and illustration purposes only. Different quantities of each type of node, greater or smaller, may be used to implement overlay network 100.

Access nodes referred to generally as reference number 108 serve as the access points to overlay network 100. Access nodes 108 authenticate clients 102 before granting access to overlay network 100. Access nodes 108 then forward traffic from the clients 102 to server 104 via overlay nodes, referred to generally as reference number 110, and target nodes, referred to generally as reference number 112.

Accordingly, for a client 102 to obtain service under protection of overlay network 100, each client is typically pre-configured with proper security credentials. Specifically, client 102 needs to have knowledge of the location of at least one access node 108, and the required credentials to mutually authenticate itself to the access node. This authentication process results in a security association between the particular client and the particular access node. This means that only legitimate clients 102 have access to overlay network 100, and only legitimate clients 102 can initiate services through access nodes 108.

In general, a client 102 can have knowledge of multiple access nodes 108, and can select which access node to enter overlay network 100 based on some types of criteria, such as performance routing policies, load balancing, and other criteria. For instance, clients 102 should be distributed among access nodes 108 for better load distribution. Generally, access nodes 108 can operate relatively independently of each other. If so desired, they can be implemented to provide ideal locations for collaborative network intrusion detection.

Overlay nodes 110 are coupled between access nodes 108 and target nodes 112. Overlay nodes 110 are generally responsible for forwarding traffic received from access nodes 108 and other overlay nodes 110 to either a target node 112 or other overlay nodes 110. As used herein, "traffic" refers to data, and "traffic flow" refers to the movement of data from one point to another point. Each overlay node 110 when forwarding traffic dynamically selects a current best (from the perspective of the present overlay node) target node 112 for accessing server 104 and the best path (i.e., next hop) to reach that target node 112.

As shall be explained in more detail, the best target node and best path to reach the target node is based on at least one "performance metric," which refers to available bandwidth, latency, packet loss rate, jitter, cost, and/or other performance metrics. For example, a file transfer service may prefer a best path to reach a target node having maximum available bandwidth. On the other hand, a real-time multimedia service may prefer a path to a target node with the least jitter.

Accordingly, the overlay nodes 110 as a whole select a best end-to-end path between a client 102 and server 104 in accordance with one or more performance metrics. One exemplary end-to-end path 114 (heavy line) between client 102(1) and server 104 is shown in FIG. 1. It is appreciated, however, that there are a myriad of best end-to-end paths 114 between clients 102 and server 104 depending on the operating characteristics of overlay network 100. In one implementation, overlay routing between a client 102 and its responses from server 104 follow the same end-to-end path using bi-directional links (e.g. nodes are bi-directional). However, it is possible that incoming requests to server 104 and outgoing responses from server 104 may take different paths.

It is also noted that communication between overlay nodes 110 is assumed to be secure. This can be achieved by setting up secure tunnels (e.g., using IPsec) among overlay nodes. Accordingly, a DoS attacker should not possess information describing how traffic is routed in overlay network 100.

Target nodes 112 serve as an exclusive gateway between overlay network 100 and server 104. This is, target nodes 112 provide the only exit and entry points for traffic to flow from overlay network 100 to server 104 and from server 104 to network 100. In other words, server 104 is ringed by a number of target nodes 112, which only handoff traffic to server 104, if the traffic originated from at least one access node 108, and vice versa.

To increase security, only target nodes 112 have knowledge of the identity of server 104 in overlay network 100. Additionally, clients 102 ideally do not have knowledge that target nodes 112 exist. If, however, clients 102 do have knowledge that target nodes 112 exist, clients 102 do not know the identity or location of target nodes 112, since only one or more overlay nodes 110 are provided the identity of target nodes 112.

Accordingly, a three-layer architecture approach may be used to protect legitimate communication between a client 102 and a server 104 from a DoS attack. At a first layer there are access nodes 108 that perform authentication of clients 102, which means only legitimate clients will be able to initiate services through access nodes. These prevent an attacker from making a focused attack against any other layers by injecting illegitimate traffic into the other layers or the server. At the second layer there are overlay nodes 110 (including access nodes 108) that perform probing techniques (to be described in more determine) to determine the best path, as defined by one or more performance metrics, to arrive at target nodes 112. At the third layer there are target nodes 112, which act as a handoff point of traffic from the overlay nodes to the server (end server). Target nodes 112 pass traffic to the server, if the traffic originated from one of the access nodes 108. Typically, only target nodes 112 have information, which identify server 104, so the only way to communicate with server 104 is through at least one target node 112.

In one implementation, each node in overlay network may have dual or triple functionality. For instance, an overlay node 110 may also serve as an access node 108 in certain applications, serve as an overlay node in other situations, or may also function as a target node in still other scenarios. It is also possible that access nodes 108, overlay nodes 110, and/or target nodes 112 may be dynamically converted to function as a different type of node depending on the application. For instance, in one application an overlay node 110 may be converted to function as a target node 112. Switching configurations may serve to heighten security over time by confusing potential DoS attackers from somehow snooping on the overlay.

Some of the methodological features that are to be described below may be implemented without necessarily having a three layer overlay network. For instance, in an alternative implementation, it may be possible to eliminate target nodes 112 and use only access nodes 108 and overlay nodes 110, although probably not as secure. In such a configuration, one or more overlay nodes 110 would forward traffic directly to server 104.

Thus, to totally disable communication, a DoS attack would need to take down all access nodes 108 as well as all target nodes 112, which is a highly intricate feat. Additionally, nodes within overlay network 100 are richly connected, thus making communication between clients 102 and server 104 highly resilient. In fact, as shall be explained in more detail, traversal within overlay network 100 adapts to attacks, which adds another level resiliency, and provides performance benefits.

In a nutshell, overlay network 100 forms a highly "malleable" shield for server 104, and its malleability provides graceful degradation under attacks. It tries to actively shift overload by rewiring (i.e., selecting) paths, which have better connectivity as well as other better performance characteristics. This approach can nicely complement and can be easily coupled with a more offensive approach to DoS such as installing filters at nodes to block unwanted and malicious traffic. Unlike the underlying physical network that is subject to routing policy constraints, a critical feature of an overlay network is that any node is virtually connected to every other node in the overlay. This novel DoS-resistant overlay network uses a distributed overlay routing methodology, which dynamically selects, for each overlay node, the "best" target node for accessing the end server and the best path (i.e., next hop) to reach that target node.

Having introduced the exemplary network environment, it is now possible to describe an exemplary physical platform that may be used to implement one or more nodes in overlay network 100.

Exemplary Computer Platform

Any functionality provided by access nodes 108, overlay nodes 110, and target nodes 112 can be implemented in any general purpose or special purpose computing system. Examples of well known computing systems, environments, and/or configurations that may be suitable for use with any one of the nodes include, but are not limited to, personal computers, server computers, multiprocessor systems, microprocessor-based systems, network computers, routers, optical switches, wireless routers, minicomputers, mainframe computers, distributed computing environments that include any of the above systems or devices, and the like.

Additionally, any exemplary functionality provided by nodes 108, 110, and 112 may be described in the general context of computer-executable instructions, such as program modules, being executed by a computer. Generally, program modules include routines, programs, objects, components, data structures, logic, and other executable data that perform particular tasks or implement particular abstract data types. Functionality provided by overlay network 100 can also be practiced in a distributed computing environment where tasks are performed by remote nodes that are linked through overlay network 100. In a distributed computing environment, program modules may be located in both local and remote computer storage media including memory storage devices.

Figure 2:
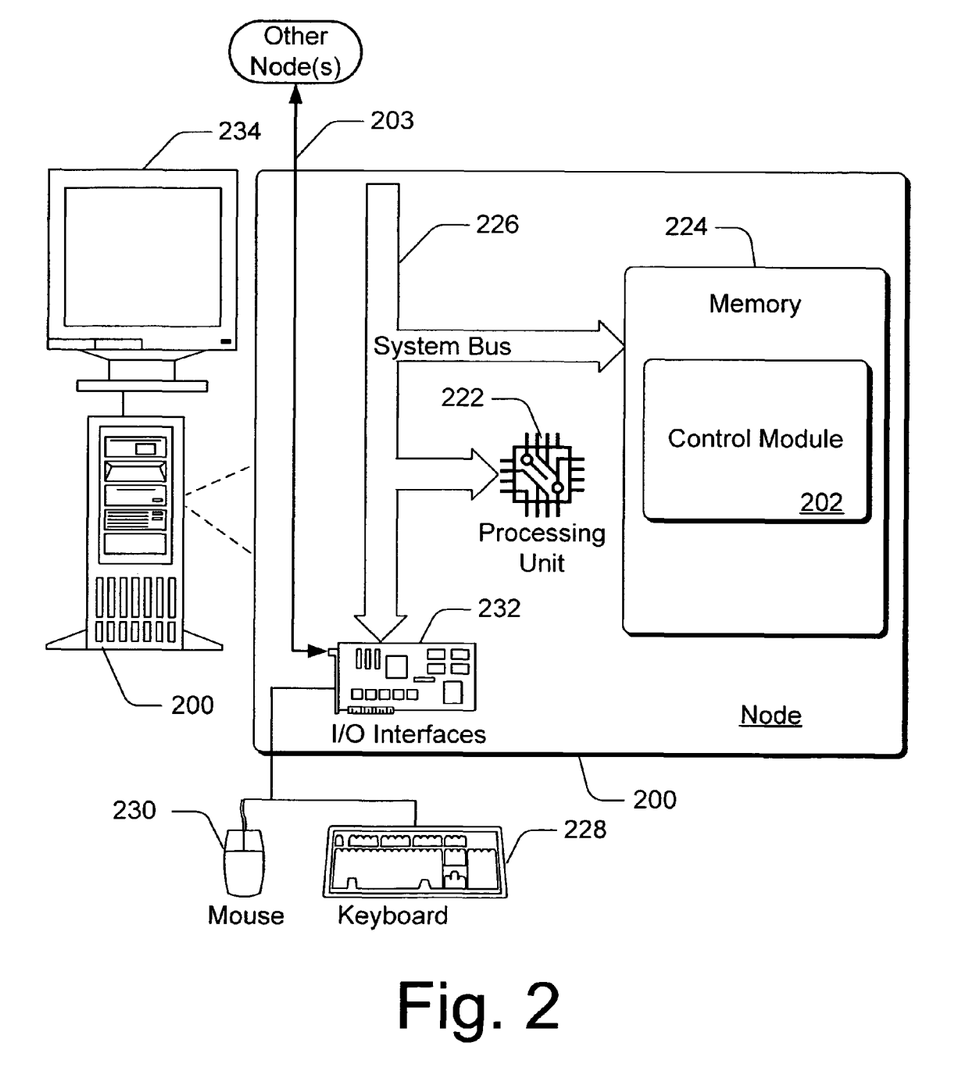
FIG. 2 illustrates an exemplary physical representation of a computer platform used to implement a node in an overlay network.

FIG. 2 illustrates an exemplary physical representation of a computer platform 200 used to implement a node in overlay network 100. In particular, computer platform 200 represents any general purpose or special purpose computing system used to implement a node (e.g., access node, overlay node and/or target node) with minor modifications to hardware, firmware, and/or software.

Each node of overlay network 100 includes a control module 202, which controls the operation of the node. Each control module 202 can be implemented in hardware, firmware, logic, software, or any combination of thereof. In the illustrative exemplary implementation control module 202 is implemented as a program module that may be described in the general context of computer-executable instructions, being executed by a computer, i.e., one or more processors in a processing unit 222. Control module 202 resides in memory 224.

Memory 224 typically includes a variety of computer readable media. Such media can be any available media that is accessible by computer platform 200 and includes both volatile and non-volatile media, removable and non-removable media. The computer-readable media provide non-volatile storage of computer readable instructions, data structures, program modules, and other data for computer platform 200. Any number of program modules can be stored in the computer readable media of memory 224, including one or more portions of control module 202.

It is also noted that portions of control module 202 may be stored in a remote memory storage device remote from computer platform 200. Additionally, even though control module 202 is illustrated herein as a discrete block, it is recognized that any of these components may reside at various times in different storage components of computer platform 200 and are executed by one or more processors of a computer, such as processing units 222.

A user can enter commands and information into computer platform 200 via input devices such as a keyboard 228 and a pointing device 230 (e.g., a "mouse"). Other input devices (not shown specifically) may include a microphone, a joystick and/or the like. These and other input devices are connected to computer platform 200 via input/output interfaces 232, such as a network or a wireless communication link. Computer platform 200 is connected to other nodes via a communication link 203. In particular, communication link 203 connects input/output interfaces 232 to overlay network 200. Finally, a monitor 234 or other type of display device can also be connected to computer platform 200 to provide graphical information to a user.

Having introduced an exemplary overlay network and an exemplary computer platform for each node in the overlay network, it is now possible to describe an exemplary probing system used by the nodes in overlay node 100.

Exemplary Probing System

Figure 3:
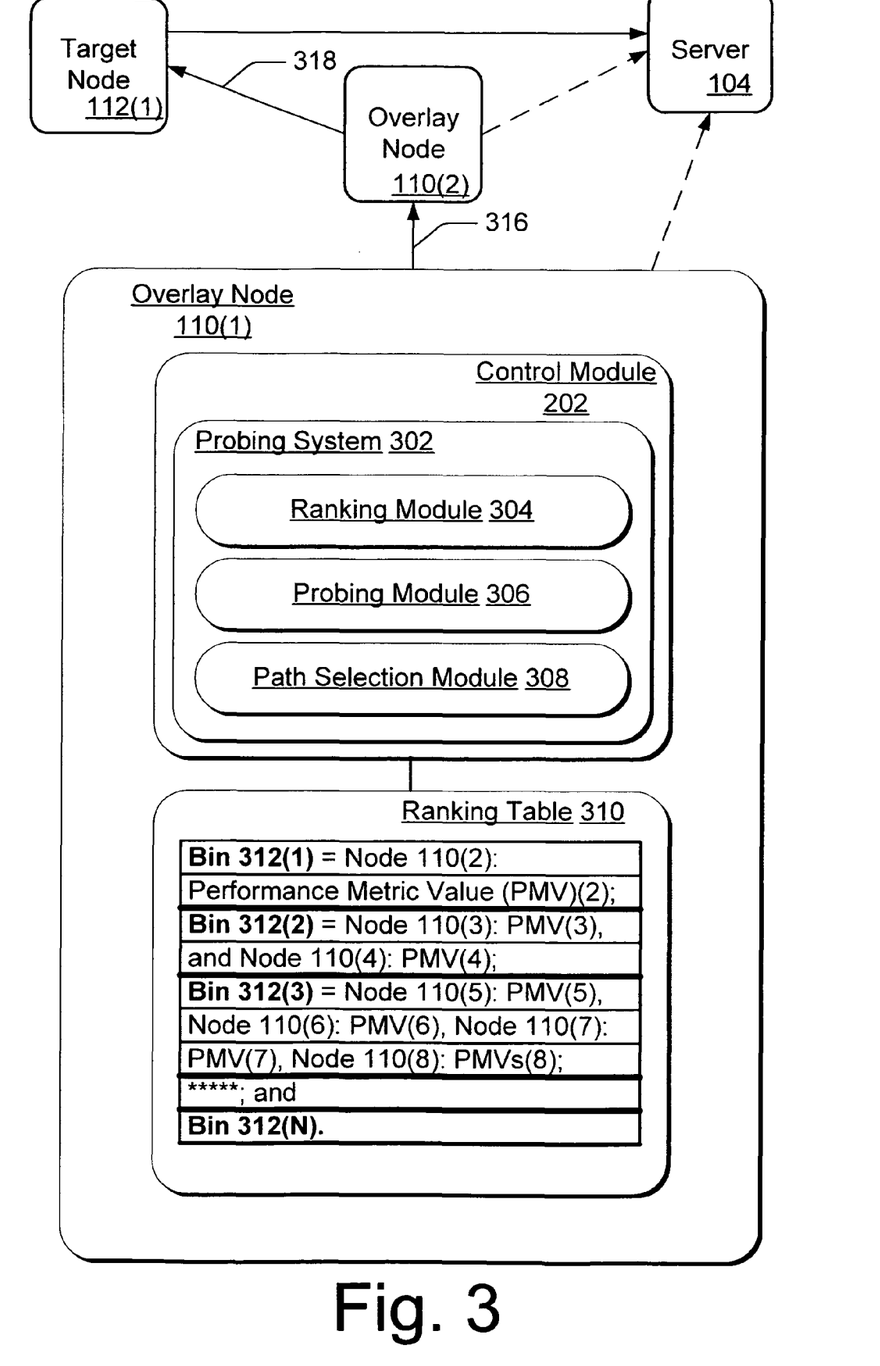
FIG. 3 illustrates an exemplary probing system for an overlay node.

FIG. 3 illustrates an exemplary probing system 302 for use in an overlay node 110. For purposes of discussion, probing system 302 is described with reference to overlay node 110 (1), but could easily be described with any other of the overlay nodes. Probing system 302 resides in control module 202 (FIG. 2). In the exemplary implementation, each probing system 302 represents computer-executable instructions executing by a processing unit 222 (FIG. 2) of a computer, but could also be implemented in hardware or any combination of hardware, firmware, logic, and software.

Probing system 302 is incorporated in overlay nodes 110 of overlay network 100. Probing system 302 enables an overlay node 110 to probe other overlay nodes 110, rank the performance of other nodes, and select a best path to reach other nodes (such as a target node 112) by selecting a path containing one or more nodes with the highest rankings.

In the illustrious implementation, probing system 302 includes: a ranking module 304, a probing module 306, and a path selection module 308. Ranking module 304 is configured to rank other nodes in an overlay network, such as other overlay nodes, based on one or more performance metrics. Higher-rankings are assigned to overlay nodes that have better performance in terms of transferring traffic to the server (typically via a target node although not required) than other overlay nodes with lower-rankings.

For example, if the performance metric is bandwidth, then nodes with higher-rankings have more bandwidth for transferring traffic than nodes with lower-rankings. If the performance metric is jitter, then nodes with higher rankings have less jitter for transferring traffic than nodes with lower-rankings. If the performance metric is latency, then nodes with higher-rankings have lower latency than other nodes with lower-rankings, and so forth.

The rankings of each of the nodes may be maintained in a ranking table 310, which can be stored in a portion of memory 224 (FIG. 2). In one implementation, the ranking table 310 may include various bins 312(1) 312(2), 312(3), . . . , 312(N), in which the identity of one or more nodes with the best performance (highest-rankings) are stored in bins 312(1) and the identity of nodes with the worst performance (lowest-rankings) are stored in bins 312(N). Along with the identity of each node is a corresponding performance metric value that indicates a given performance for an overlay link to reach that node as well as the performance level of the best path to reach a target node from that node.

Probing module 306 is configured to probe other overlay nodes to access their performance in accordance with one or more performance metrics. Probing module 306 probes a portion of the overlay nodes with higher-rankings more frequently than overlay nodes with lower-rankings. Probing module 306 uses rankings of overlay nodes as basis for selecting which nodes to probe more frequently. As used herein, a "portion" means one or more nodes.

For example, during a probing interval, probing module 306 will probe one or more overlay nodes with the best performance, i.e., those nodes listed in bin 312(1). In the exemplary implementation, when a node probes another node, it not only measures the value of a given performance metric for the overlay link to reach that node, but is also requests both the best path for that node to reach a target node and the value of the metric for that path.

For example, suppose that node 110(1) probes node 110(2) and the performance metric desired is bandwidth. Accordingly, node 110(1) will measure how much bandwidth is available to reach node 110(2) via a path 316. Node 110(1) will also measure how much bandwidth is available to reach a target node 112(1) from node 110(2) via a best path 318. Based on these two measurements, node 110(1) is able to assign a performance metric value, which corresponds to the performance assigned to node 110(2). Based on the performance metric value, node 110(1) is also able to rank node 110(2) by determining whether its performance metric value is better or worse than the other overlay nodes.

After each probing interval, the ranking module 304 determines whether a performance metric value of a highest-ranked node may have degraded below a performance metric value assigned to a lower-ranked node. The ranking module 304 is configured to demote one or more nodes with the highest-ranking (e.g., in bin 312(1)), if the performance metric value assigned to the one or more nodes in bin 312(1) falls below the performance metric value assigned to one or more nodes with lower-rankings, such as stored in bin 312(2). The ranking module 304 is also configured to promote those nodes with previously lower-rankings to higher-rankings, if their performance levels (based on the performance metric value) surpass those one or more nodes with previously higher-rankings. Accordingly, based on the probing performed by probing module 306, ranking module 304 can promote an overlay node to a higher-ranked bin, which will result in an increased probe frequency, or demote an overlay node to a lower-ranked bin, which results in its being probed less frequently.

Path selection module 308 typically selects a path including one or more nodes with the highest-rankings to route traffic to a target node. For example, path selection 308 will select node 110(2) to be included as part of a pathway for transferring traffic to target node 112(1), since node 110(2) has the highest-ranking (e.g., it is ranked in bin 312(1)) in the illustrative embodiment. In a less secure alternative implementation, it is possible to route directly from an overlay node, such as node 110(2), directly to server 104 without using a target node as described above. In this scenario, node 110(2) would behave like a target node.

Although probing system 302 is shown to include three distinct functional blocks (ranking module 304, probing module 306, and path selection module 308), it is understood that when actually implemented in the form of computer-executable instructions, logic, firmware, and/or hardware, that the functionality described with reference to each block may not exist as separate identifiable modules. The probing system 302 may also be integrated with other components or as module in a larger system. In most instances, whether integrated or not, probing system 302 enables a node to (i) rank other overlay nodes according to one or more performance metrics, and (ii) probe a portion of the other overlay nodes with higher-rankings and better performance more frequently than overlay nodes with lower-rankings and inferior performance when compared to the higher-ranked nodes.

Having introduced various components of a probing system 302, it is now possible to describe how probing system 302 probes and ranks other nodes in more detail.

Methods of Operation

Methods for probing system 302 may be described in the general context of processor-executable instructions. The described methods may also be practiced in distributed computing environments where functions are performed by remote processing devices that are linked through a communications network. In a distributed computing environment, computer-executable instructions may be located in both local and remote storage media, including memory storage devices.

Figure 4:
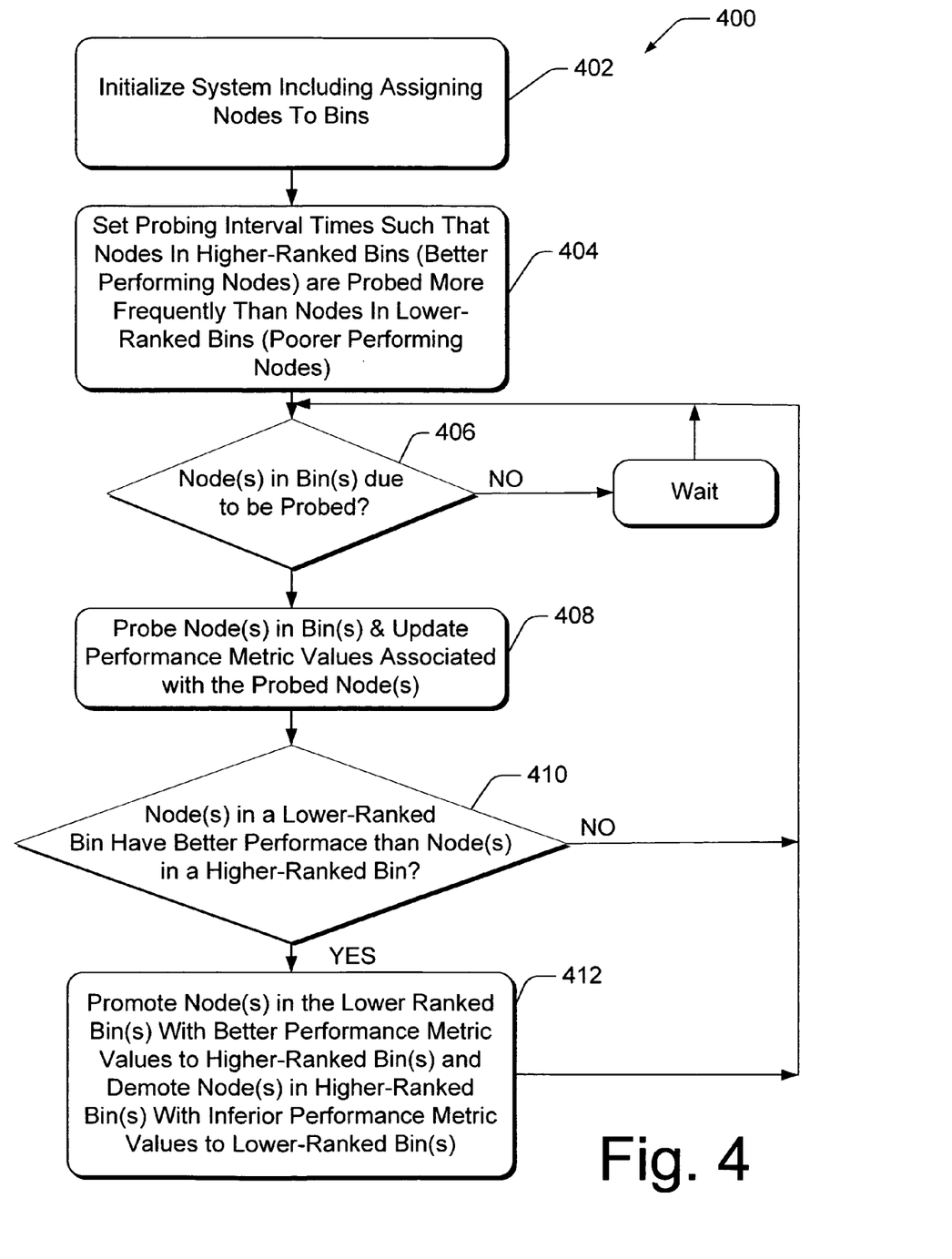
FIG. 4 illustrates an exemplary method for probing and ranking other nodes in an overlay network.

FIG. 4 illustrates an exemplary method 400 for probing and ranking other nodes in an overlay network. Method 400 enables each overlay node in an overlay network to probe other nodes in an efficient manner. Based on rankings associated with performance of each node probed, each overlay node is able to respond to network states such as a DoS attack, by adapting overlay topology by selecting a best path (maximizing end-to-end performance) for routing traffic between clients and an end-server, based on one or more performance metrics.

Method 400 includes blocks 402, 404, 406, 408, 410, and 412. The order in which the method is described is not to be construed as a limitation, and any number of the described method blocks can be combined in any order to implement the method. Furthermore, the method can be implemented in any suitable hardware, software, firmware, or combination thereof.

Exemplary method 400 shall be described interchangeably with reference to FIG. 3. For purposes of discussion, method 400 is illustrated from the perspective of node 110(1) in FIG. 3, but can apply to any overly node in an overlay node network 100 (FIG. 1).

In block 402, initialization is performed. In the exemplary implementation, this involves randomly selecting nodes and assigning them to bins. For instance, assign overlay node 110(2) to a highest-ranked bin 312(1), assign two overlay nodes 110(3) and 110(4) in a next highest-ranked bin 312(2), assign four overlay nodes 110(5), 110(6), 110(7), and 110(8) to a next bin 312(3), assign eight overlay nodes 110(9), 110 (10), 110(11), 110(12), 110(13), 110(14), 110(15), and 110 (16) to a next highest bin, and so forth. The number of overlay nodes selected for each bin is for discussion purposes, and the actual number selected for each bin may vary. Additionally, instead of randomly assigning nodes to bins, in alternative implementation, it is possible to probe all the nodes one time, and based on their responses, assign nodes to bins according to their potential for transferring traffic to a target node based on the one or more performance metrics.

In block 404, a probing interval is set for each bin. For instance, any node in bin 312(1) is assigned to be probed every Δ, where Δ is constant value in seconds. Any node in bin 312(2) is assigned to be probed every 2Δ, every node in bin 312(3) is assigned to be probed every 4Δ, and so forth. The actual interval times for each node to be probed may vary depending on the implementation. Typically, however, the overlay node in bin 312(1) is probed more frequently than overlay nodes in bin 312(2), and overlay nodes in bin 312(2) are probed more frequently than overlay nodes in bin 312(3), and so forth.

In a decisional block 406, a decision is made whether Δ, (2Δ for bin 312(2), 4Δ for bin 312(3), and so forth) seconds has elapsed. If according to the NO branch of decisional block 406, Δ seconds has not elapsed then process 400 will wait until Δ, 2Δ, 4Δ, etc., seconds has elapsed. If according to the YES branch of decisional block 406, Δ seconds has elapsed (or 2 or 4Δ, etc.) then process 400 will proceed to block 408. In a block 408, one or more nodes in one or more particular bins are probed. For example, a highest-ranked bin 312(1) is probed every Δ. The next highest-ranked bin 312(2) is probed every 2Δ, and the next highest ranked bin 312(3) is probed every 4Δ, and so forth. Referring to the illustrative example of FIG. 3, when the highest-ranked bin 312(1) is probed every Δ the current node residing in bin 312(1), e.g., node 110(2) is probed. When the next highest-ranked bin 312(2) is probed every 2Δ, nodes 110(3) and 110(4) are probed along with 110(2).

Based on the probing of node 110(2), overlay node 110(1) is able to assign a performance metric value (such as a number) to node 110(2), which corresponds to the capability of node 110(2) to transfer traffic to a target node 112 (FIG. 1). The same is true, when overlay node 110(1) probes other nodes in bins 312(2), 312(3), . . . , 312(N).

Next, in a decisional block 410, a determination is made whether one or more nodes in a particular bin that was probed in block 408, has better performance than nodes in lower-ranked bin. For example, a determination is made whether overlay node 110(2) in bin 312(1) has a better performance metric value than performance metric values associated with overlay nodes 110(3) and/or 110(4) in bins 312(2).

If according to the NO branch of decisional 410, no overlay node in bin 312(2) has better performance than node(s) in bin 312(1), method 400 proceeds back to decisional block 406.

On the other hand, if according to the YES branch of decisional block 410, one or more nodes in a lower-ranked bin have better performance than nodes in higher-ranked bin, then one or more nodes from the lower-ranked bin are promoted to higher-ranked bins and one or more nodes from higher-ranked bins are demoted to lower-ranked bins. For example, if either of the overlay nodes in bin 312(2) have better performance than one or more overlay nodes in bin 312(1), then node 110(2) is demoted to bin 312(2), and either node 110(3) and/or node 110(4), is promoted to bin 312(1); typically which ever has better performance based on the performance metric value. Then process 400 proceeds back to decisional block 406.

In decisional block 410, a determination can also be is made whether any node in a next successive consecutive bin, e.g., bin 312(3) has better performance metric values associated with them than nodes in a previous bin, such as bin 312(2) or 312(1). If according to the NO branch of decisional block 410, no overlay node in bin 312(3) has better performance the overlay nodes in bin 312(2), then the process proceeds back to block 406. On the other hand, if according to the YES branch decisional block 410, an overlay node in bin 312(3) has better performance than overlay nodes in bin 312(2), then process 400 proceeds back to block 412. For example, if one or more nodes from bin 312(3) that are deemed to have better performance than overlay nodes in bin 312(2), then the one or more nodes from bin 312(3) are promoted to bin 312(2) up to the maximum number of nodes assigned to bin 312(2). And for each node with better performance from bin 312(3), an equal number of one or more overlay nodes from bin 312(2) are demoted to bin 312(3). This methodology can be extrapolated for up to 312(N) bins. That is, further comparisons can be made between consecutive bins until each consecutive successive bin has been compared to the previous bin.

It is noted that this is one exemplary methodology for promoting and ranking nodes. Other methodologies may be used where higher-ranked nodes are probed more frequently than lower-ranked nodes over time. For example, rankings can be performed without assigning nodes to bins, such as by assigning each node a ranking number, and using the ranking number as a basis to decide how often a particular node is probed.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. An overlay network for maintaining traffic flow between a client and a server during a denial of service attack, comprising: a set of overlay nodes, coupled between the client and the server, wherein each overlay node comprises: a ranking module configured to rank the overlay nodes based on a performance metric, wherein an overlay node with a higher-ranking indicates that the overlay node has better performance for transferring traffic to the server than overlay nodes with lower-rankings; and a probing module configured to probe a portion of the overlay nodes with higher-rankings more frequently than overlay nodes with lower-rankings during probing intervals, each overlay node having a performance metric comprising an amount of bandwidth available to reach the overlay node from a probing node and an amount of bandwidth available between the overlay node and a target node and wherein an overlay node having a higher amount of available bandwidth has a higher ranking than another overlay node with a lower amount of available bandwidth.

2. The overlay network as recited in claim 1, wherein each overlay node further comprises a path selection module, configured to dynamically select an overlay node with a highest-rankings to be included as part of a pathway for transferring traffic to the server.

3. The overlay network as recited in claim 1, further comprising an access node, configured to authenticate traffic directed to the server from the client, and forward authenticated traffic to one or more of the overlay nodes.

4. The overlay network as recited in claim 1, further comprising one or more target nodes, configured to transfer the traffic from one or more of the overlay nodes directly to the server, the one or more target nodes having exclusive knowledge of an identity for the server.

5. The overlay network as recited in claim 1, wherein each overlay node is virtually connected to each other.

6. The overlay network as recited in claim 1, wherein the performance metric includes at least one of: latency, loss rate, and jitter; and wherein an overlay node with a higher-ranking indicates that the overlay node has better performance for transferring traffic to the server than overlay nodes with lower-rankings, the better performance including at least one of: less jitter, lower latency, and less packet loss.

7. The overlay network as recited in claim 1, wherein the ranking module is further configured to determine whether the portion of overlay nodes with higher-rankings continue to have better performance for transferring traffic to the server than one or more of the overlay nodes with lower-rankings after a probing interval.

8. The overlay network as recited in claim 1, wherein the ranking module is configured to demote the rankings of the portion of overlay nodes with higher-rankings to lower-rankings if the portion of overlay nodes with higher-rankings have worse performance for transferring traffic to the server than one or more of the overlay nodes with lower-rankings after a probing interval.

9. The overlay network as recited in claim 1, wherein the traffic is data.

10. A method for evaluating overlay nodes in a network to mitigate against a denial of service attack, the method comprising: ranking the overlay nodes based on a performance metric comprising bandwidth that is available to reach an overlay node from a probing node and bandwidth that is available to reach a target node from the overlay node, wherein an overlay node with a higher-ranking indicates that the overlay node has better performance for transferring traffic to a target than overlay nodes with lower-rankings; and probing a portion of the overlay nodes with higher-rankings more frequently than overlay nodes with lower-rankings during probing intervals.

11. The method as recited in claim 10, wherein the performance metric includes at least one of: available bandwidth, latency, loss rate, and jitter.

12. The method as recited in claim 10, wherein an overlay node with a higher-ranking indicates that the overlay node has better performance for transferring traffic to a target than overlay nodes with lower-rankings, the better performance including at least one of: less jitter, lower latency, and less packet loss.

13. The method as recited in claim 10, wherein the portion of the overlay nodes with higher-rankings includes one or more overlay nodes.

14. The method as recited in claim 10, wherein the target includes at least one of:
an overlay node, an overlay node with exclusive access to a host server, and a host server.

15. The method as recited in claim 10, comprising determining whether the portion of overlay nodes with higher-rankings continue to have better performance for transferring traffic to a target than one or more of the overlay nodes with lower-rankings after a probing interval.

16. The method as recited in claim 10, comprising determining whether the portion of overlay nodes with higher-rankings continue to have better performance for transferring traffic to a target than one or more of the overlay nodes with lower-rankings after a probing interval; and demoting the rankings of the portion of overlay nodes with higher-rankings to lower-rankings if the portion of overlay nodes with higher-rankings have worse performance for transferring traffic to a target than one or more of the overlay nodes with lower-rankings.

17. The method as recited in claim 10, comprising determining whether the portion of overlay nodes with higher-rankings continue to have better performance for transferring traffic to a target than one or more of the overlay nodes with lower-rankings after a probing interval; and promoting the rankings of one or more of the overlay nodes with lower-rankings to higher-rankings, if the portion of overlay nodes with higher-rankings have worse performance for transferring traffic to a target than one or more of the overlay nodes with lower-rankings.

18. The method as recited in claim 10, comprising selecting the portion of the overlay nodes with higher-rankings to be included as part of a pathway for transferring traffic to a target.

19. One or more computer-readable media comprising computer executable instructions that, when executed, direct a computer to: evaluate overlay nodes in an overlay network; rank the overlay nodes based on a performance metric comprising bandwidth that is available to reach an overlay node from a probing node and bandwidth that is available to reach a target node from the overlay node, wherein an overlay node with a higher-ranking indicates that the overlay node has better performance for transferring traffic to a target than overlay nodes with lower-rankings; and probe a portion of the overlay nodes with higher-rankings more frequently than overlay nodes with lower-rankings during probing intervals.

20. One or more computer-readable media as recited in claim 19, further comprising computer executable instructions that, when executed, direct the computer to: determine whether the portion of overlay nodes with higher-rankings continue to have better performance for transferring traffic to a target than one or more of the overlay nodes with lower-rankings after a probing interval.

21. One or more computer-readable media as recited in claim 19, further comprising computer executable instructions that, when executed, direct the computer to: determine whether the portion of overlay nodes with higher-rankings continue to have better performance for transferring traffic to a target than one or more of the overlay nodes with lower-rankings after a probing interval; and demote the rankings of the portion of overlay nodes with higher-rankings to lower-rankings if the portion of overlay nodes with higher-rankings have worse performance for transferring traffic to a target than one or more of the overlay nodes with lower-rankings.

22. In a network comprising overlay nodes interspersed between a server and client, a system for mitigating against a denial of service attack, the system comprising: at least one overlay node; means for probing overlay nodes in the network during a probing interval to determine connectivity levels of each overlay node; the at least one overlay node comprising means for ranking each overlay node wherein an overlay node having a highest-ranking has a highest connectivity potential for transferring traffic to the server, the means for ranking assigning at least one overlay node with a first, highest ranking, at least one other overlay node with a second ranking that is lower than the first ranking and at least one other overlay node with a third ranking that is lower than the second ranking; means for selecting the overlay node with the highest-ranking to be included as part of a pathway for transferring the traffic to the server; and means for probing a portion of the overlay nodes with higher-rankings more frequently than other overlay nodes during subsequent probing intervals, the means for probing using a first timing for probing an overlay node having the first ranking with a first interval between probes, the means for probing using a second timing for probing an overlay node having the second ranking with a second interval between probes, the second interval being longer than the first interval and the means for probing using a third timing probing an overlay node having the third ranking with a third interval between probes, the third interval being longer than the second interval.

23. An overlay network to mitigate a Denial of Service attack, comprising: access nodes configured to authenticate traffic directed to a server from a client; target nodes configured to transfer the traffic previously authenticated by the access nodes to the server; and overlay nodes, coupled between the access nodes and the target nodes, configured to route the traffic from the access nodes to the target nodes by selecting a best end-to-end path between the client and the server based in accordance with at least one performance metric, wherein each overlay node comprises: a ranking module configured to rank the overlay nodes based on the performance metric, wherein an overlay node with a higher-ranking indicates that the overlay node has better performance for transferring traffic to one of the target nodes than overlay nodes with lower-rankings; and a probing module configured to probe a portion of the overlay nodes with higher-rankings more frequently than overlay nodes with lower-rankings during probing intervals, the ranking module ranking a first overlay node with a first ranking, a second, different overlay node with a second, lower ranking and a third, different overlay node with a third ranking that is lower than. the second ranking, theprobing module probing the first overlay node more often than probing the second overlay node and probing the second overlay node more often than probing the third overlay node.

24. The overlay network as recited in claim 23, wherein each overlay node is configured to dynamically select, a best target node for accessing the server and a best path to reach that target node.

25. The overlay network as recited in claim 24, wherein the best path is selected via a best next hop measured in terms of the at least one performance metric.

26. In an overlay network, a node for maintaining traffic flow between a client and a server during a denial of service attack, the node comprising: a ranking module configured to rank overlay nodes coupled between the client and the server based on a performance metric, wherein overlay nodes with a higher-ranking indicates that the overlay nodes have better performance for transferring traffic to the server than overlay nodes with lower-rankings; and a probing module configured to probe a portion of the overlay nodes with higher-rankings more frequently than overlay nodes with lower-rankings during probing intervals, the ranking module ranking a first overlay node with a first ranking, a second, different overlay node with a second, lower ranking and a third, different overlay node with a third ranking that is lower than the second ranking, the probing module probing the first overlay node more often than the second overlay node and probing the second overlay node more often than the third overlay node.

* * * * *